FACSIMILE PRIVACY APPARATUS

Filed Aug. 29, 1944

LEO ROSEN
INVENTOR

By William D. Hall
Attorney

United States Patent Office 3,384,705
Patented May 21, 1968

3,384,705

FACSIMILE PRIVACY APPARATUS

Leo Rosen, Arlington, Va.
(Heritage Apartments, G–5, Essex, Conn. 06426)

Filed Aug. 29, 1944, Ser. No. 551,766
2 Claims. (Cl. 178—5.1)

The invention described herein may be manufactured and used by or for the Government for governmental purposes, without the payment of any royalty thereon.

This invention is in electrical communications systems, and particularly is a means for so enciphering certain types of communications signals as to make them unintelligible except at authorized receiving stations.

The method and apparatus of this invention are intended especially for treating signals which can be reduced to a series of "marking" and "spacing" or "current" and "no-current" impulses. While it is known that some types of signals either normally take this form (Teletype, for example) or can readily be reduced thereto, the description to follow will be directed to facsimile transmission.

A facsimile picture is the result of successive photocell current responses which are directly proportional to the photographic density of the picture or other subject being copied. The proportionality between subject copy density and photocell current may be disorganized by electrically reversing the current equivalents of picture elements or groups of elements of the subject copy.

Obviously, a simple reversal, that is, the transmission of a signal all the elements of which are opposite in value to the components of the original signal, will result in a simple negative of the original picture. This would be useless for secrecy purposes. In accordance with this invention, changes are caused to occur in a predetermined pattern; such a pattern may hereinafter be referred to as a "key." The scrambled signal output of the system of this invention, it will be seen, is dependent upon a combination of variables, namely: the density distribution of the subject picture and the coding key or pattern. The theoretical limit of coding by this method is the reduction of a black and white picture to a signal which will reproduce as a uniform and medium gray.

But a system such as that outlined above, wherein changes in the transmitted signal occur in accordance with instantaneous combinations of facsimile and randomly arranged keying signals, does not provide sufficient security for military purposes, in view of the advanced state of the art of deciphering signals of this nature.

One object of the present invention is to provide a means for readily converting a facsimile signal or the like into a series of marking and spacing impulses which will convey substantially the intelligence of the original signal.

A second object is to provide a facsimile signal capable of being regenerated for transmission over long wire and radio circuits.

Another object is to provide means for encoding a communications signal by reversing the values of certain of the signal components.

Another object is to provide means for superimposing upon a communications signal a keying pattern which will effectively reverse the values of certain of the signal components in accordance with a predetermined arrangement.

It is a further object of the invention to provide means for changing the nature of a communications signal independently of changes normally occurring in said signal.

An additional object is to provide means for preventing changes in a communications signal except at predetermined points in time.

Other objects will be apparent from a reading of the following specification and claims.

Figure 1:
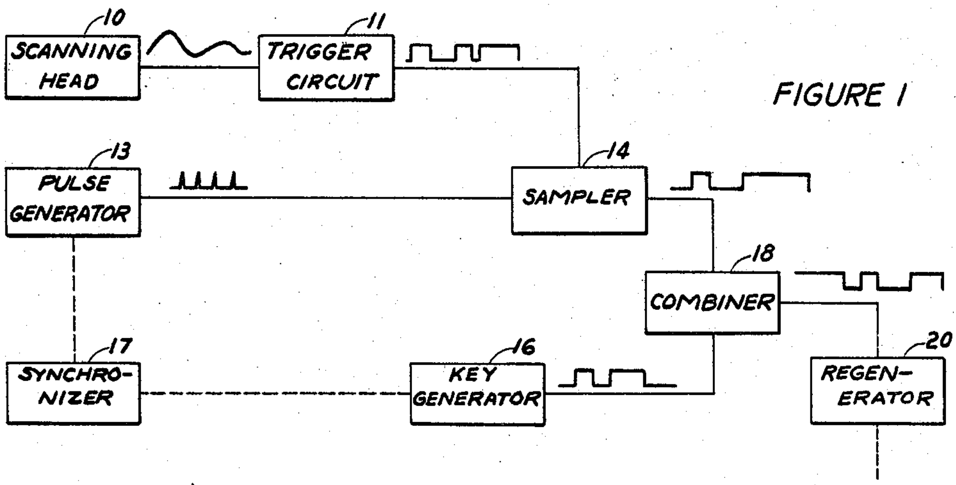
FIGURE 1 is a block diagram of the transmitting apparatus of my invention.

Referring to the drawings, 10 represents a pick-up device or scanning head of conventional type. The wave form of the output of the scanning head is indicated at 10′ in FIGURE 2. The signal is applied to a trigger circuit 11, that being, of course, a circuit in which the output voltage or current changes abruptly from one stable value to another stable value at a critical input value, and then back to approximately the original value at a different critical input value. The output of the trigger circuit 11 is represented at 11′, FIGURE 2.

A pulse generator 13 produces a signal indicated at 13′. The pulse generator should be suitably controlled by a tuning fork, crystal, or other device. A similar output, it will be understood, can be obtained by other means.

A trigger circuit 14, the output of which cannot change except under the control of a controlling voltage or current, receives the output of pulse generator 13. In this description, trigger circuit 14 may be termed a "sampler." It has been so labelled in the drawing. The controlling signal is in this case the output of pulse generator 13.

The output of trigger circuit 11 also is applied to the sampler 14 as can be seen from block diagram, FIGURE 1. The sampler 14 produces an output which depends upon the on-off signal 11′ and pulses 13′. In other words, the sampler will not conduct until pulsed by generator 13 and then only if the output of trigger circuit 11 is at the upper of its two possible values. The sampler will continue to conduct until the expiration of the time interval in which the output of trigger circuit 11 falls off.

No sampler circuit is shown in detail, as a suitable one can be easily devised. One prior-art arrangement which may be employed is the so-called locking circuit of the patent to R. S. Mathes, 1,979,484 (see FIGURE 3 and 4, and page 3 of the specification). For slow-speed operation, a regenerative repeater such as is common in Teletype circuits can be employed. The output of the sampler is represented at 14′.

The switching pattern or key is generated at 16 in any desired fashion. A record, tape, or electronic circuit can be used. The nature of the key will be further described hereinafter, but a representative keying signal is indicated at 16′, FIGURE 2. It is sufficient here to say that 16′ consists of a series of current or voltage values which may be referred to as "marking" and "spacing" values, their lengths varying substantially at random, but always in multiples of a unit determined by the pulses of generator 13; the "longer" impulses in reality comprise two or more consecutive marking or spacing impulses. The output of the sampler 14 consists also of marking and spacing values, the sequence and relationship of which depend at least partially upon the output of the scanning head 10. Means indicated at 17 synchronize the key generator 16 and the output of pulse generator 13. The necessary synchronism can be obtained through independent time signals, with or without an additional intermittent synchronizing signal, or by means of a continually transmitted synchronizing signal alone.

The keying signal 16′ and the sampler output 14′ are applied to "combiner" circuit 18, wherein the two signals are combined algebraically in accordance with one of the two systems tabulated below:

| | Input 1 | | Input 2 | | Output |
|---|---|---|---|---|---|
| System 1: | Mark | + | Mark | = | Space |
| | Space | + | Space | = | Space |
| | Mark | + | Space | = | Mark |
| | Space | + | Mark | = | Mark |
| System 2: | Mark | + | Mark | = | Mark |
| | Space | + | Space | = | Mark |
| | Mark | + | Space | = | Space |
| | Space | + | Mark | = | Space |

No combining circuit is shown in detail. Suitable circuits suggest themselves for responding in one fashion to an input of two like signals and in another fashion to an input of two unlike signals. For example, the structure shown in FIGS. 1 and 2 of Patent No. 2,175,847, to Mathes, granted Oct. 10, 1939, may be used, assuming that the second of the above-listed systems is used. With this structure, a cam 13 actuates a switch 11 between two positions, and one of its positions causes a reversal of the normal output potentials from a reader 5. Referring to the waveforms 1, 2 and 3 of FIG. 3, waveform 1 is a signal representing the message on the tape 4 which passes through the reader 5 or the up-down movement of an armature 15 which is actuated by the message signal. When the switch 11 is in a first of its two positions, a relatively-positive (or marking) potential is applied to the armature 15, and when it is in its second position, a relatively-negative (or spacing) potential is applied thereto as shown in waveform 2.

Figure 2:
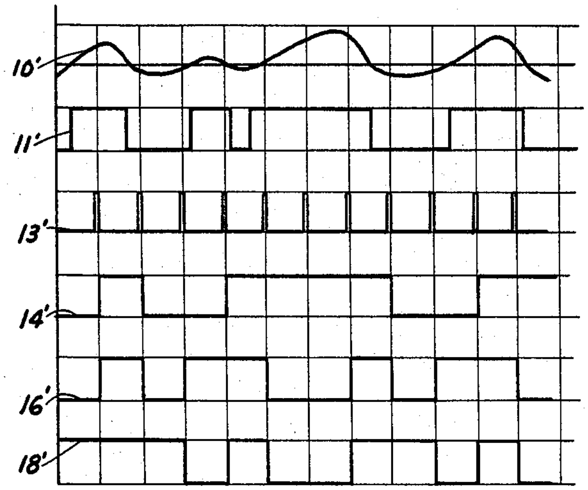
FIGURE 2 represents various signal conditions occurring during the pick-up, scrambling, and transmission of a facsimile signal according to the invention.
Figure 3:
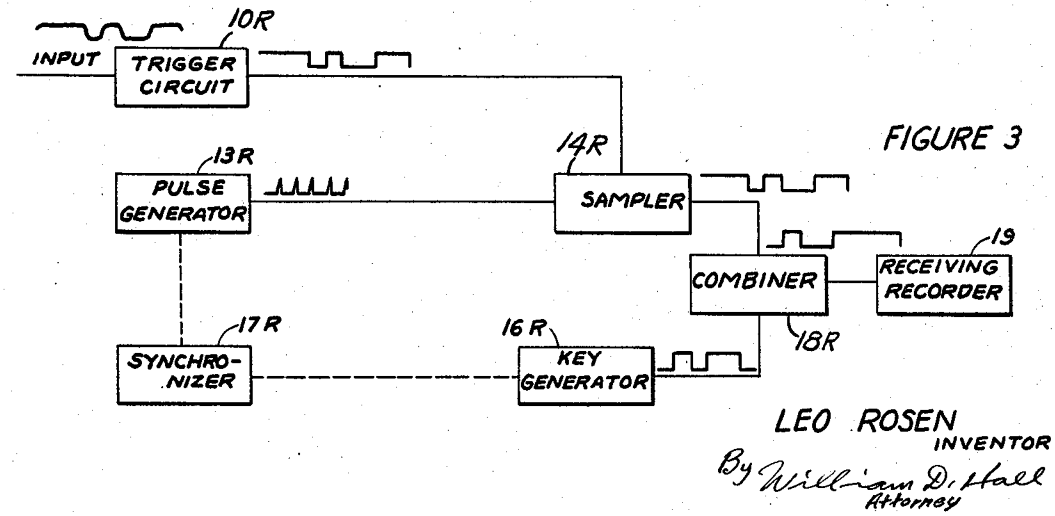
FIGURE 3 is a block diagram of the principal elements of the receiving apparatus.

As described in the Mathes patent, waveform 3 results from combining waveforms 1 and 2. Referring to FIG. 3, it will be seen that when waveforms 1 and 2 are either both marking or both spacing, waveform 3 is marking. However, should either of these waveforms be marking and the other spacing, the waveform 3 is spacing. Referring to FIG. 2 of the drawing of the present invention, it will be seen that waveform 16′ and waveform 14′ are combined in a similar manner to result in the waveform 18′ which is transmitted at the output of the combiner 18 when the second system is used as described above.

A normal facsimile signal can be transmitted without noticeable distortion relatively short distances only, and cannot be regenerated successfully since in the regeneration process a distortion already present will be amplified along with what remains of the true signal. The output of combining circuit 18 of this invention is, however, as has been explained, a series of marking and spacing impulses of identical length, which are transmitted under conditions which provide complete regularity. These make it possible to regenerate the output as many times as desired, reliance for proper reproduction being placed upon the central portion of each marking signal, that always being the portion last to decay. Means for performing this operation are known and will not be described in detail herein. One regenerator is shown as a block 20 in the diagram of FIGURE 1. If preferred, a trigger circuit, such as 11 of FIGURE 1, can be used for regenerating the signal.

According to the foregoing description, the apparatus of FIGURE 1 is intended for transmission. With but minor obvious changes, however, it is entirely suitable for reception, as can readily be seen by comparing it with the showing of FIGURE 3. The differences are that no scanning head is used at the input of the receiver, and a recorder is used at its output.

The trigger circuit 10R may not always be required for reception. Frequently, however, the square wave output of combiner 18 (FIGURE 1) will, during transmission, suffer distortion or decay, and it is then desirable to "shape" the wave before further treatment.

In actual use, the one apparatus serves both to transmit and to receive, the pick-up and the recorder being cut in and out of the circuit by means of switches. With this understanding, the function of pulse generator 13R, sampler 14R, key generator 16R, synchronizer 17R, combiner 18R and recorder 19 will be obvious without further description. Synchronization between the transmitter and receiving equipments may be maintained in the manner suggested by the Mathes patent. For example, a correction unit similar to the correction circuit 34 of FIG. 2 of that patent may be utilized to control the pulse generator 13R in accordance with the output of the pulse generator 13. In the Mathes patent, the speed at which the cam 20 is in recorder is rotated is varied by the correction circuit 34 to maintain synchronization with the cam 13 at the transmitter. The pulse generator 13R of the present invention may be controlled in a similar manner to be synchronized with the output of the pulse generator 13 at the transmitter.

The effect of the operation of this invention is to produce a signal from which it cannot be ascertained whether a particular picture element was black or white. In other words, when the scanner is traversing a white portion of the picture, the output signal may represent either a black or white portion and usually will be such as would, if not decoded, reproduce as alternate black and white portions, and a black portion of the original picture may remain black in the coded picture or it may be changed to white. More important, however, than providing mere alteration in an output signal from "black" to "white" is the fact that such changes will not always occur as a result of subject picture or key changes. The output signal will change only when permitted to do so by the output of the pulse generator.

Various modifications of the above system will suggest themselves. Thus, different types of keying signals can be used, and the switching rate can be changed as desired. Further, the circuit components can be re-arranged somewhat without altering the basic principles of the invention; for instance, sampler 14 can be located beyond combiner 18 rather than before the same, or, more than one sampler can be used. For the true scope of the invention, therefore, reference should be had to the appended claims wherein, it should be understood, the expression "marking and spacing" is to be considered as properly describing signals of current and no-current impulses and other signals wherein intelligence is conveyed by means of sequential arrangement of preselected electrical values.

I claim as my invention:

1. The combination of means for producing a signal comprising marking and spacing values and means for enciphering said signal; the last-mentioned means including means for furnishing a keying signal of marking and spacing values, a pulse generator and synchronizing means for controlling said pulse generator and key-furnishing means; a trigger circuit having two conditions of conductivity controllable by said first mentioned signal and pulses from said generator acting conjointly to assume one condition and by the pulse generator alone to cause the same to assume its other condition; and means for combining the output of the trigger circuit and the keying signal.

2. Means for secretly communicating facsimiles, said means comprising a scanning head located so as to receive light under the control of the matter transmitted and whose output is an undulatory wave, a trigger circuit connected to said scanning head and arranged to receive the output thereof and to shape the wave passing therethrough into a rectangular wave, a pulse generator whose output is a wave composed of a series of recurrent sharp peaks, a sampler circuit whose characteristic it is to change its output only when energized by one of the peaks from said pulse generator and connected to said pulse generator and to said trigger circuit, a key generator whose output is a wave composed of a series of recurrent rectangular pulses whose durations vary according to a predetermined pattern, a combiner circuit in which the outputs of said sampler circuit and of said key generator are combined algebraically according to a predetermined system into a systematized output, a second pulse generator whose output is a wave composed of a series of recurrent sharp peaks substantially the same as the output of said first mentioned pulse generator, a second key generator whose output is a wave composed of a series of recurrent rectangular pulses whose durations vary according to the same predetermined pattern as the output of said first mentioned key generator, means for synchronizing the outputs of said pulse generators with their respective said key generators, a second sampler circuit whose characteristic it is to change its output only when energized by one of the peaks from said second pulse generator and connected to receive the outputs of said combiner circuit and of said second pulse generator, a second combiner circuit in which the outputs of said second sampler circuit and of said second key generator are combined according to said predetermined system and which produces an output in consonance with the output from said scanning head, and a reproducing head connected to receive the output from said second combiner circuit and to reproduce a facsimile of the matter transmitted.

References Cited

UNITED STATES PATENTS

| | | | |
|---|---|---|---|
| 1,310,719 | 7/1919 | Vernam | 178—22 |
| 1,613,686 | 1/1927 | Vernam | 178—5.1 |
| 1,356,546 | 10/1920 | Morehouse | 178—22 |
| 1,979,484 | 11/1934 | Mathes | 343—201 |
| 2,002,208 | 5/1935 | McFarlane | 178—6.7 |
| 2,175,847 | 10/1939 | Mathes | 178—22 |
| 2,272,070 | 2/1942 | Reeves | 250—27 |
| 2,403,059 | 7/1946 | Dillenback et al. | |
| 2,426,225 | 8/1947 | Krause | 179—1.5 |
| 2,465,367 | 3/1949 | Friedman et al. | 178—5.1 |
| 2,552,548 | 5/1951 | Friedman | 178—5.1 |

ROBERT L. GRIFFIN, *Primary Examiner.*

C. L. JUSTUS, JAMES BAWINK, C. J. SPENCER, *Examiners.*

L. N. DAVIS, N. N. LOVEWELL, F. M. STRADER, H. W. BRITTON, *Assistant Examiners.*